(12) United States Patent
Chrisp et al.

(10) Patent No.: US 7,239,386 B2
(45) Date of Patent: Jul. 3, 2007

(54) COMPACT IMAGING SPECTROMETER UTILIZING IMMERSED GRATINGS

(75) Inventors: Michael P. Chrisp, Danville, CA (US); Scott A. Lerner, Corvallis, OR (US); Paul J. Kuzmenko, Livermore, CA (US); Charles L. Bennett, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/920,880

(22) Filed: Aug. 17, 2004

(65) Prior Publication Data
US 2006/0038994 A1 Feb. 23, 2006

(51) Int. Cl.
G01J 3/28 (2006.01)

(52) U.S. Cl. .................................. 356/328

(58) Field of Classification Search ............. 356/305, 356/326, 328, 334; 250/339.07
See application file for complete search history.

(56) References Cited

U.S. PATENT DOCUMENTS

| | | | |
|---|---|---|---|
| 5,127,728 A | 7/1992 | Warren et al. | |
| 5,717,487 A | 2/1998 | Davies | |
| 5,781,290 A | 7/1998 | Bittner et al. | |
| 5,880,834 A | 3/1999 | Chrisp | |
| 6,016,220 A | 1/2000 | Cook | |
| 6,078,048 A | 6/2000 | Stevens et al. | |
| 6,100,974 A | 8/2000 | Reininger | |
| 6,122,051 A | 9/2000 | Ansley et al. | |
| 6,266,140 B1 | 7/2001 | Xiang et al. | |
| 6,388,799 B1 | 5/2002 | Arnone et al. | |
| 6,538,737 B2 | 3/2003 | Sandstrom et al. | |
| 6,922,240 B2 * | 7/2005 | Lerner et al. | 356/328 |
| 6,977,727 B2 * | 12/2005 | Lerner | 356/328 |
| 6,985,226 B2 * | 1/2006 | Lerner | 356/328 |
| 2002/0101587 A1 | 8/2002 | Wilson et al. | |
| 2002/0135770 A1 | 9/2002 | Lewis et al. | |
| 2003/0016355 A1 | 1/2003 | Koike et al. | |
| 2004/0156048 A1 | 8/2004 | Mitchell | |
| 2005/0051729 A1 * | 3/2005 | Chrisp | 250/339.07 |
| 2005/0052647 A1 * | 3/2005 | Lerner | 356/328 |
| 2005/0073680 A1 * | 4/2005 | Chrisp et al. | 356/328 |

FOREIGN PATENT DOCUMENTS

WO  WO 99/63311  12/1999

OTHER PUBLICATIONS

Lee, D., et al., "An experimental investigation of immersed gratings," Mon. Not R. Astron. Soc 312, (2000), pp. 57-69.

* cited by examiner

Primary Examiner—F. L. Evans
(74) Attorney, Agent, or Firm—Eddie E. Scott; John H. Lee

(57) ABSTRACT

A compact imaging spectrometer with an immersive diffraction grating that compensates optical distortions. The imaging spectrometer comprises an entrance slit for transmitting light, means for receiving the light and directing the light, an immersion grating, and a detector array. The entrance slit, the means for receiving the light, the immersion grating, and the detector array are positioned wherein the entrance slit transmits light to the means for receiving the light and the means for receiving the light directs the light to the immersion grating and the immersion grating receives the light and directs the light to the means for receiving the light, and the means for receiving the light directs the light to the detector array.

6 Claims, 8 Drawing Sheets

COMPACT IMAGING SPECTROMETER UTILIZING IMMERSED GRATINGS

The United States Government has rights in this invention pursuant to Contract No. W-7405-ENG-48 between the United States Department of Energy and the University of California for the operation of Lawrence Livermore National Laboratory.

CROSS-REFERENCE TO RELATED APPLICATIONS

Related subject matter is disclosed and claimed in the following commonly owned, co-pending, U.S. Patent Applications with at least one common inventor: U.S. patent application Ser. No. 10/646,666 filed Aug. 21, 2003 by Charles L. Bennett, Jay V. Bixler, Paul J. Kuzmenko, Scott A. Lerner, and Isabella T. Lewis, titled "Compact Refractive Imaging Spectrometer Utilizing Immersed Gratings," and U.S. patent application Ser. No. 10/658,150 filed Sep. 9, 2003 by Michael P. Chrisp, titled "Compact Reflective Imaging Spectrometer Utilizing Immersed Gratings," and U.S. patent application Ser. No. 10/658,141 filed Sep. 9, 2003 by Scott A. Lerner, titled "Compact Catadioptric Imaging Spectrometer Utilizing Immersed Grating" and U.S. patent application Ser. No. 10/680,788 filed Oct. 6, 2003 by Scott A. Lerner, titled "Compact Catadioptric Imaging Spectrometer Utilizing Reflective Grating," and U.S. patent application Ser. No. 10/680,847 filed Oct. 6, 2003 by Scott A. Lerner, titled "Compact Imaging Spectrometer Utilizing Immersed Gratings," and U.S. patent application Ser. No. 10/844,086 filed May 11, 2004 by Scott A. Lerner, titled "Compact Imaging Spectrometer Design Utilizing An Immersed Grating and Anamorphic Mirror," and U.S. patent application Ser. No. 10/877,622 filed Jun. 24, 2004, 2004 by Michael P. Chrisp and Scott A. Lerner, titled "Imaging Spectrometer Utilizing Immersed Gratings with Accessible Entrance Slit."

BACKGROUND

1. Field of Endeavor

The present invention relates to a spectrometer and more particularly to a compact imaging spectrometer.

2. State of Technology

U.S. Pat. No. 5,717,487 provides the following state of technology information: "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter."

U.S. Patent Application No. 20020135770 published Sep. 26, 2003 provides the following state of technology information: "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 provides the following state of technology information: "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 $cm^{-1}$ This provides for maximum sensitivity to simple molecules with the narrowest spectral features, allows for corrections for the presence of atmospheric constituents, maximizing species selectivity, and provides greater opportunity to detect unanticipated species."

U.S. Pat. No. 5,880,834 provides the following state of technology information: "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a compact imaging spectrometer with an immersive diffraction grating that compensates optical distortions. The imaging spectrometer comprises an entrance slit for transmitting light, means for receiving the light and directing the light, an immersion grating, and a detector array. The entrance slit, the means for receiving the light, the immersion grating, and the detector array are positioned wherein the entrance slit transmits light to the means for receiving the light and the means for receiving the light directs the light to the immersion grating and the immersion grating receives the light and directs the light through an optical element to the detector array.

The compact imaging spectrometer uses smaller cryogenic coolers facilitating its using in portable (man carried) gas detection systems and in small unmanned aerial vehicles for remote gas detection. These instruments have application for Homeland Defense to check for the presence of biological or chemical weapons without entering the contaminated areas. These instruments can be used for pollution detection, and remote sensing of agricultural crops, and geological identification. They can also be used for the remote monitoring of industrial processes.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
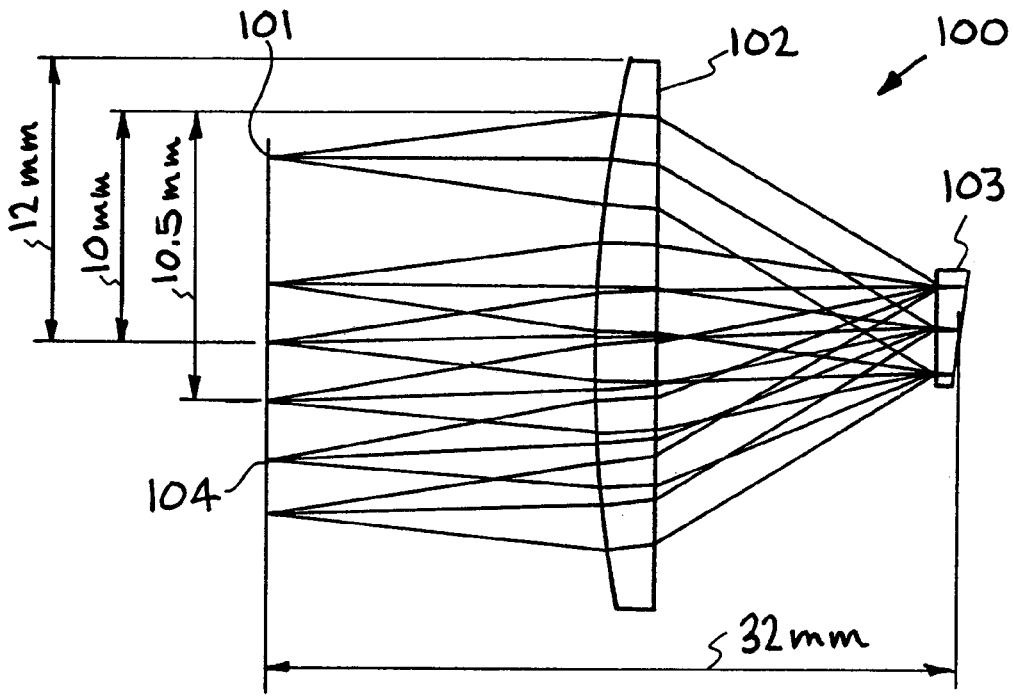
FIG. 1 illustrates an embodiment of a compact imaging spectrometer utilizing a single lens constructed in accordance with the present invention.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1 of the drawings, an embodiment of a compact imaging spectrometer constructed in accordance with the present invention is illustrated. This embodiment of the present invention is designated generally by the reference numeral 100. FIG. 1 is a raytrace of the imaging spectrometer 100. The structural elements of the compact imaging spectrometer 100 include an entrance slit 101, a lens 102, a germanium immersion grating 103, and detector 104.

The compact imaging spectrometer 100 utilizes immersion grating 103 for correction of optical distortion. Both the front and back surfaces of the immersion grating 103 are plano. The immersion diffraction grating 103 can be ruled on a germanium, zinc selenide, or other refractive prism. The immersion grating 103 has 115 grooves/mm.

One embodiment of the immersion grating 103 consists of a reflective grating that is index matched to a refractive prism such that the combination of the refractive grating and the refractive prism are nearly optically identical to the immersion grating ruled on the prism itself. Furthermore, the immersion grating assembly may consist of one or more prisms of the same or different glass types for additional degrees of freedom in the correction of optical distortion and wavefront aberrations. Ruling a reflective grating may be significantly less costly than the ruling of an immersion prism. The utility in index matching a reflective grating to a refractive prism is that it may be significantly less costly and it will provide nearly identical optical performance. The immersion grating 103 provides the mating of a square pupil to the immersion grating. The design of the immersion grating may use any shape pupil. However, a square pupil that matches the bilateral symmetry of the detector allows additional etendue through the system with little or no additional optical correction necessary to meet the same system requirements as for a round pupil.

The imaging spectrometer 100 has been designed to the requirements in Table 1 and is diffraction limited over the wavelength range with excellent spatial and spectral resolutions. The spectral slit curvature has been corrected to less than one tenth of a pixel over the detector arrays. This is the curvature of slit image on the detector 104 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects.

For the imaging spectrometer 100, light from slit 101 is collimated by the lens 102. The immersion grating 103, located at the stop of the system, disperses the collimated light and then the lens 102 focuses light onto the detector 104. For the nominal design, the immersion grating 103 has three degrees of freedom: wedge, tilt, and grating spacing. The prism wedge of the immersion grating 103 defines design symmetry such that the smile distortion from the immersion grating balances the smile from the focusing lens. The tilt directs the front surface ghost reflection such that it does not fall on the detector 104. The groove spacing controls the spectral dispersion.

The cold stop is at the germanium grating 103. This ensures that the warm background radiation from outside the spectrometer entrance slit 101 does not reach the detector array 104. This would cause unacceptable degradation in the signal to noise ratio. The geometry of imaging spectrometer 100 allows a transmissive cold stop to be used ahead of the grating, for even better thermal background reduction, but this also increases the grating size.

The imaging spectrometer 100 has use for Homeland Defense to check for the presence of biological or chemical weapons without entering the contaminated areas. The imaging spectrometer 100 also has use for commercial remote sensing where portability is important. The imaging spectrometer 100 can be used for pollution detection, and remote sensing of agricultural crops, and geological identification among the various potential applications. The imaging spectrometer 100 can be used for the remote monitoring of industrial processes.

Small size for an imaging spectrometer is extremely important because it determines the requirements for the cryogenic cooling. For example, if the spectrometer is small it can fly in a small UAV. Also, if the spectrometer is small it is person portable. The imaging spectrometer 100 has a size envelope that is smaller than spectrometers currently in use. The entrance slit 101, lens 102, germanium grating 103, and detector 104 fit within the envelope. The X axis and the Y axis are shown in the plane of the paper. The Z axis extends perpendicular to both the X axis and the Y axis. The envelope is 3.2 cm by 2.0 cm by 1.5 cm or smaller. As shown in FIG. 1, the X axis is 3.2 cm, the Y axis is 2.0 cm, and the Z axis is 1.5 cm. The compact imaging spectrometer 100 has a front and a back. The entrance slit 101 is located at or near the font and the grating 103 is located at or near the back.

TABLE 1

| | |
|---|---|
| Spectral Range | 7.5–13.5 microns |
| F-number (round or square) | 4 |
| Detector array | 256 spatial × 256 spectral |
| Pixel Size | 40 microns |
| Entrance Slit Length | 10.24 mm |
| Spatial Distortion: Change in Spatial Mapping with Wavelength | <0.1 pixel (<±2 microns) |
| Spectral Distortion: Spectral Smile | <0.1 pixel (<±2 microns) |
| Optical Performance | Diffraction Limited |
| Ghosting | <0.1% of the primary image |

The imaging spectrometer of the present invention has many uses. Examples of its use include use in Homeland Defense to check for the presence of biological or chemical weapons without entering the contaminated areas. The imaging spectrometer also has use for commercial remote sensing where portability is important. The imaging spectrometer can be used for pollution detection and remote sensing of agricultural crops. It can be used for geological identification and for the remote monitoring of industrial processes. These are examples of the various potential applications of the imaging spectrometer of the present invention. The invention is not intended to be limited to the particular uses disclosed and the invention covers all uses falling within the spirit and scope of the invention as defined by the claims.

Figure 2:
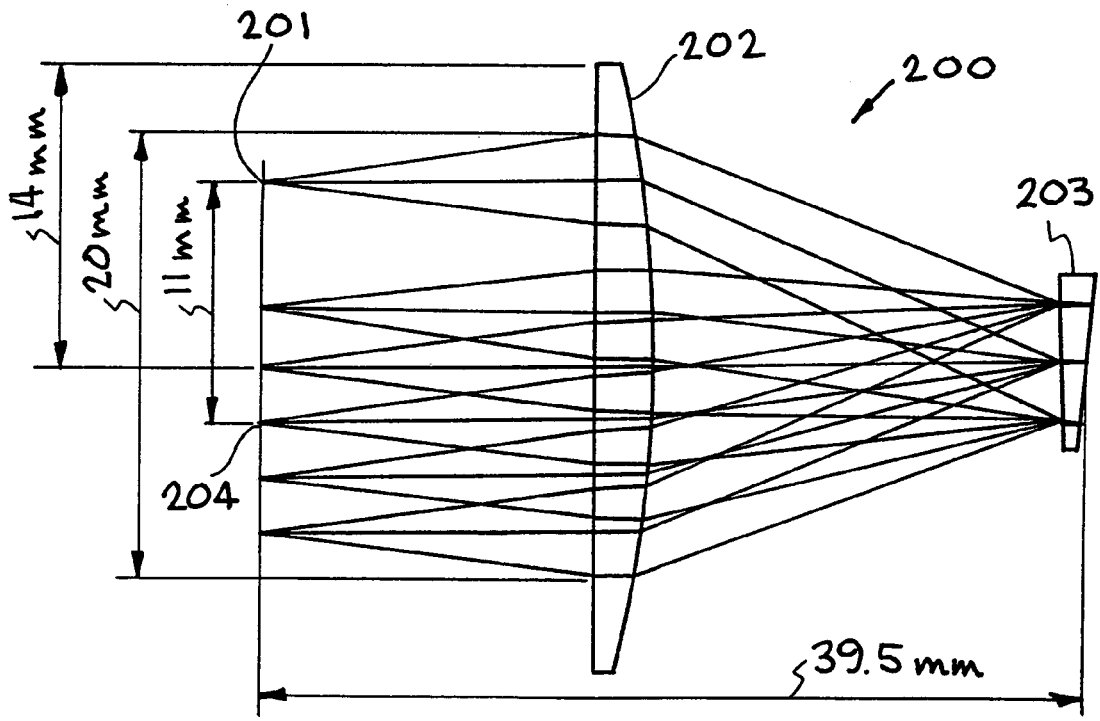
FIG. 2 illustrates an embodiment of a compact imaging spectrometer utilizing a plano convex lens constructed in accordance with the present invention.

Referring now to FIG. 2 of the drawings, an embodiment of a compact imaging spectrometer constructed in accordance with the present invention is illustrated. This embodiment of the present invention is designated generally by the reference numeral 200. FIG. 2 is a raytrace of a compact imaging spectrometer 200 that utilizes an immersion grating for correction of optical distortion. The structural elements of the compact imaging spectrometer 200 include an entrance slit 201, a lens 202, a germanium immersion grating 203, and detector 204. The immersion grating 203 has a curved front surface that mitigates stray light in the design and provides additional wavefront correction for the spectrometer design. The immersion grating 203 has 84 grooves/mm.

The compact imaging spectrometer 200 utilizes immersion grating 203 for correction of optical distortion. The imaging spectrometer 200 meets the requirements in Table 1 and is diffraction limited over the wavelength range with excellent spatial and spectral resolution. The spectral slit curvature has been corrected to less than one tenth of a pixel over the detector arrays. This is the curvature of slit image on the detector 204 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects.

Small size for an imaging spectrometer is extremely important because it determines the requirements for the cryogenic cooling. For example, if the spectrometer is small it can fly in a small UAV. Also, if the spectrometer is small it is person portable. The imaging spectrometer 200 has a size envelope that is smaller than spectrometers currently in use.

Figure 3:
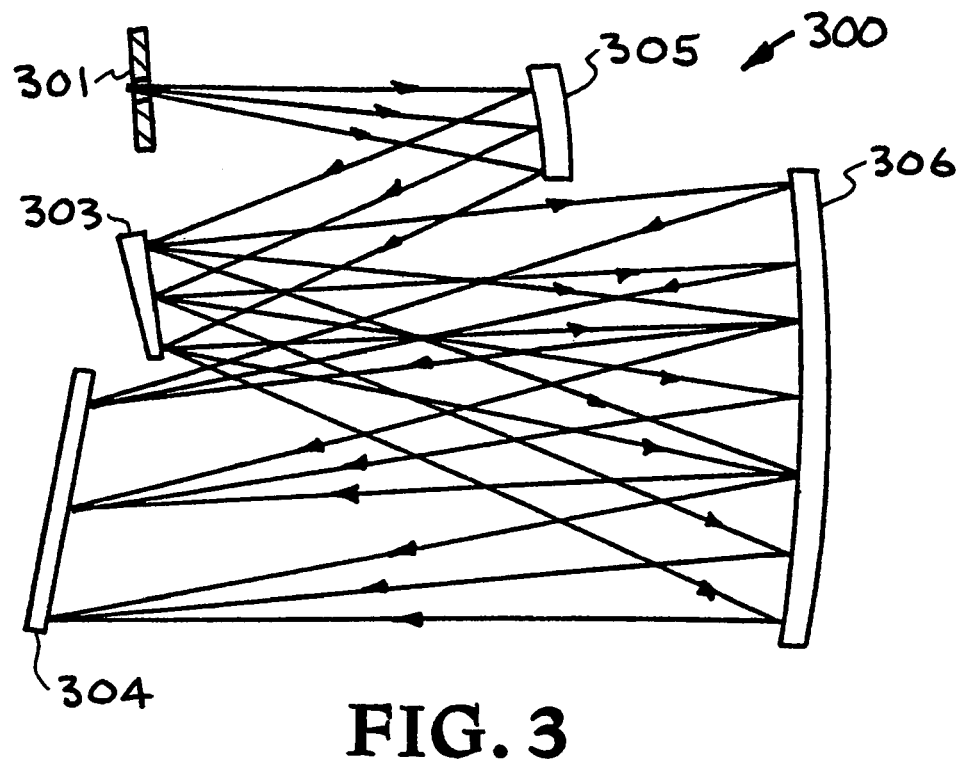
FIG. 3 illustrates an embodiment of a compact imaging spectrometer utilizing reflective mirrors constructed in accordance with the present invention.

Referring now to FIG. 3 of the drawings, an embodiment of a compact imaging spectrometer constructed in accordance with the present invention is illustrated. This embodiment of the present invention is designated generally by the reference numeral 300. FIG. 3 is a raytrace of a compact imaging spectrometer 300 with an immersion grating used to correct the spectral slit curvature. The structural elements of the compact imaging spectrometer 300 include an entrance slit 301, a mirror 305, a germanium immersion grating 303, a mirror 306, and detector 304.

The compact imaging spectrometer 300 utilizes immersion grating 303 for correction of optical distortion. The immersion grating 303 can be ruled on a germanium, zinc selenide, or other refractive prism. A reflective grating that is index matched to a refractive prism such that the combination of the refractive grating and the refractive prism are nearly optically identical to the immersion grating ruled on the prism itself could be used for the immersion grating 303. Furthermore, the immersion grating assembly may consist of one or more prisms of the same or different glass types for additional degrees of freedom in the correction of optical distortion and wavefront aberrations. Ruling a reflective grating may be significantly less costly than the ruling of an immersion prism.

The imaging spectrometer 300 meets the requirements in Table 1 and is diffraction limited over the wavelength range with excellent spatial and spectral resolutions. The spectral slit curvature has been corrected to less than one tenth of a pixel over the detector arrays. This is the curvature of slit image on the detector 304 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects.

The compact imaging spectrometer 300 is smaller than spectrometers currently in use. The reduced cryogenic cooling requirements of the compact imaging spectrometer 300 allow its use in small unmanned aerial vehicles. The reduced cryogenic cooling requirements of the compact imaging spectrometer 300 also allows it to be used for man portable instruments. The compact imaging spectrometer 300 has a size envelope that is smaller than spectrometers currently in use. The entrance slit 301, the first mirror 305, the immersive diffraction grating 303, the second mirror 306, and the detector array 304 fit within the envelope. The envelope is 2.5 cm by 3.2 cm by 2.2 cm or smaller. As shown in FIG. 3 the X axis is 3.2 cm and the Y axis is 2.5 cm and the z-axis 2.2 cm.

Figure 4:
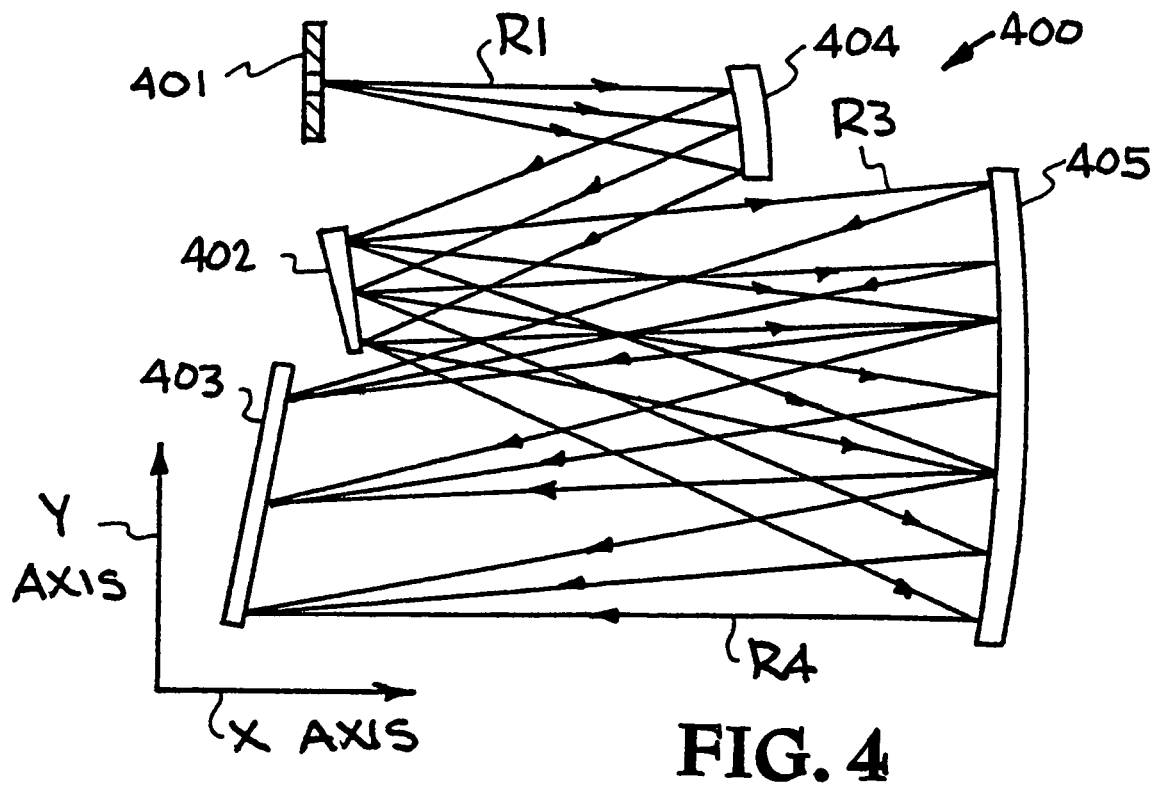
FIG. 4 illustrates a perspective view of a compact imaging spectrometer utilizing reflective mirrors shown in FIG. 3.

FIG. 4, is a perspective view of the compact reflective imaging spectrometer in FIG. 3. This embodiment is designated generally by the reference numeral 400. FIG. 4 is a raytrace for the compact imaging spectrometer 400. The embodiment 400 of a compact reflective imaging spectrometer includes a two-dimensional detector array to enable spectral analysis of the spatial structure of objects within the scene.

The structural elements of the compact imaging spectrometer 400 include an entrance slit 401, a germanium or zinc selenide grating 402, an array detector 403, a concave mirror 405, and a concave mirror 405. The compact imaging spectrometer 400 provides an infrared reflective imaging spectrometer apparatus that comprises an entrance slit for directing light, a concave reflective primary mirror for reducing the divergence of said light from said entrance slit, a wedged germanium or zinc selenide grating dispersing said light and a concave reflective secondary mirror focusing said light onto a two-dimensional detector array.

The compact imaging spectrometer 400 is smaller than spectrometers currently in use. The reduced cryogenic cooling requirements of the compact imaging spectrometer 400 allow its use in small unmanned aerial vehicles. The reduced cryogenic cooling requirements of the compact imaging spectrometer 400 also allow it to be used for man portable instruments. The compact imaging spectrometer 400 meets the requirements in Table 1 and is diffraction limited at all wavelengths and spatial points on the detector.

The concave mirrors 404 and 804 in the compact imaging spectrometer 400 can be diamond turned and are sections of spheres or rotational aspheres. The germanium or zinc selenide diffraction grating 402 has the rulings immersed into a flat germanium or zinc selenide surface. The grating can be diamond flycut with a blazed profile that will have maximum diffraction efficiency. In the compact imaging spectrometer 400 conventional gratings are used with equally spaced straight rulings. Performance improvement is obtained with curved gratings with varying the ruling spacings. For the diffraction grating, light enters from the front germanium or zinc selenide surface (which usually has power) and then passes through the germanium to diffract off the grating rulings at the back surface. The diffracted light then propagates through the germanium and out through the front surface. The grating is cut on the back of a wedged plano-convex or plano-concave lens. In some of these designs the power can be eliminated from the lens resulting in the grating being cut on the back of a wedged germanium prism.

Figure 5:
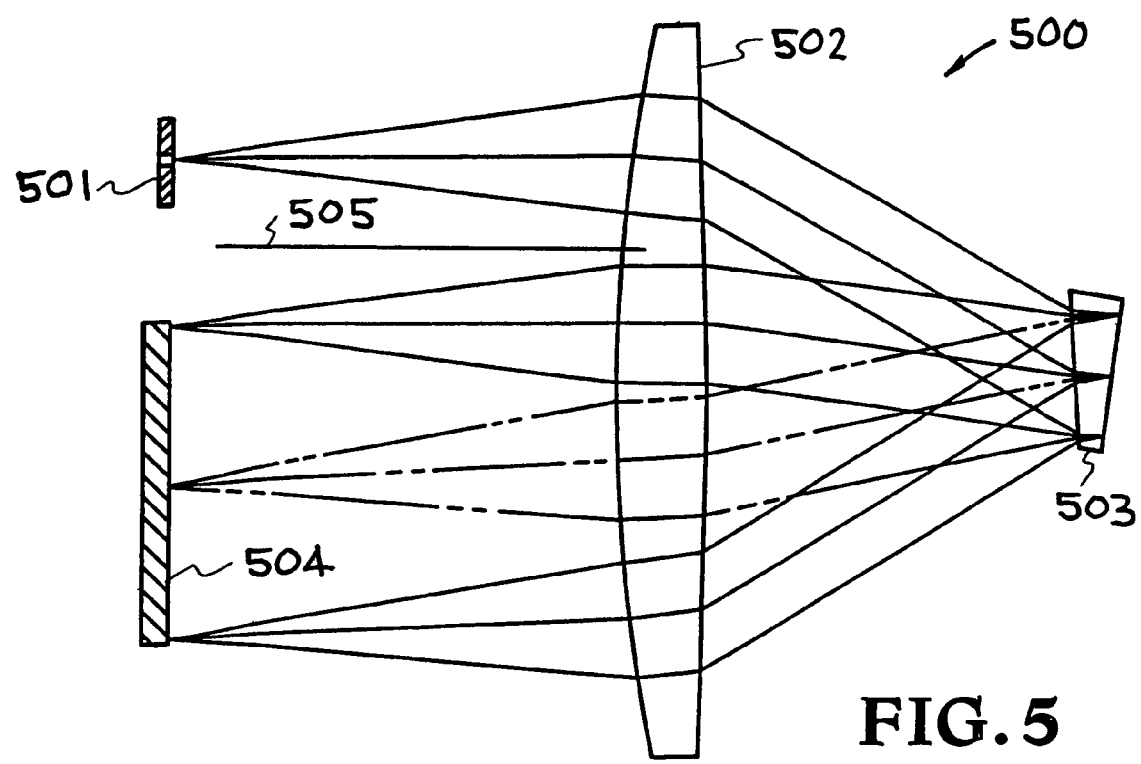
FIG. 5 illustrates an embodiment of a compact imaging spectrometer utilizing a refractive lens constructed in accordance with the present invention.

Referring to FIG. 5 of the drawings, an embodiment of a compact imaging spectrometer constructed in accordance with the present invention is illustrated. This embodiment of the present invention is designated generally by the reference numeral 500. FIG. 5 is a raytrace for the imaging spectrometer 500. The structural elements in the compact imaging spectrometer 500 include slit 501, lens 502, immersed diffraction grating 503, 2D detector 504, and baffle 505. The imaging spectrometer 500 has a size envelope that is smaller than spectrometers currently in use. The slit 501, lens 502, immersed diffraction grating 503, and 2D detector 504 fit within the envelope. The envelope is 3.5 cm by 1.9 cm by 1.2 cm or smaller.

As shown in FIG. 5, light goes from the entrance slit 501 to the lens 502, which refracts it to the ruled germanium grating 503. The diffracted order then propagates back to the lens 502, which focuses onto the 2D detector array 503. The germanium grating 503 is a wedged prism that is plano on both faces and with the grating ruled on the flat reflective side. The baffle 504 mitigates stray light at the detector 504. The compact imaging spectrometer 500 solves the requirements for compact imaging spectrometers meeting the performance requirements given in Table 1.

Figure 6:
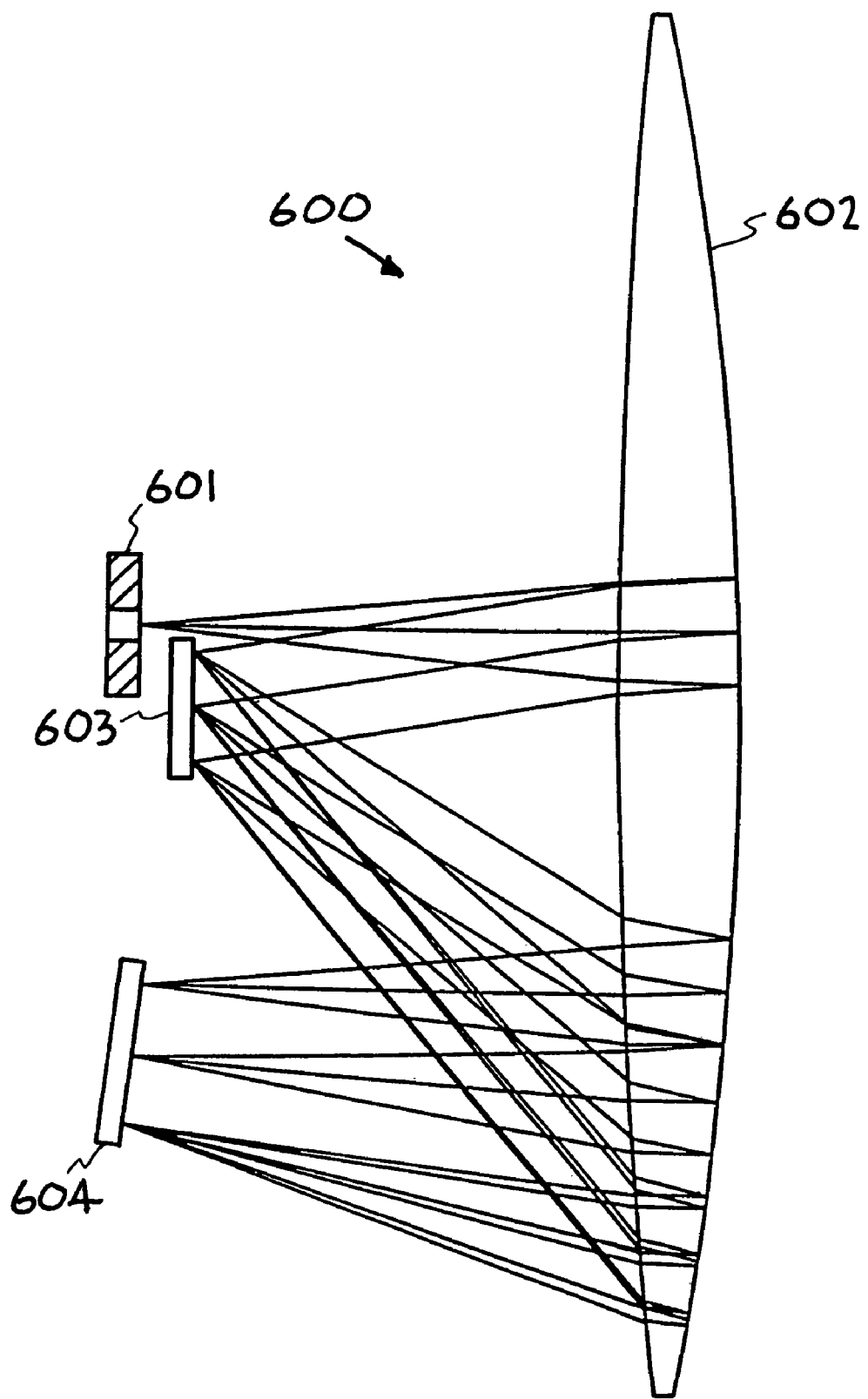
FIG. 6 illustrates an embodiment of a compact imaging spectrometer utilizing a reflective grating constructed in accordance with the present invention.

Referring to FIG. 6 of the drawings, an embodiment of a compact imaging spectrometer utilizing a catadioptric lens constructed in accordance with the present invention is illustrated. Where a catadioptric lens is a compound lens with both refractive and reflective surfaces. This embodiment of the present invention is designated generally by the reference numeral 600. FIG. 6 is a raytrace for the imaging spectrometer 600. The structural elements of the compact imaging spectrometer 600 include an entrance slit 601, a rotationally symmetric zinc selenide aspheric lens 602, a germanium grating 603, and a 2D detector array 604.

The imaging spectrometer 600 has a size envelope that is smaller than spectrometers currently in use. The entrance slit 601, rotationally symmetric zinc selenide aspheric lens 602, germanium grating 603, and 2D detector array 604 fit within the envelope. The envelope is 4.5 cm by 5.6 cm by 2.2 cm or smaller. As shown in FIG. 6, the X axis is 4.5 cm and the Y axis is 5.6 cm.

As shown in FIG. 6, light goes from the entrance slit 601 to the rotationally symmetric zinc selenide aspheric lens 602. The rotationally symmetric zinc selenide aspheric lens 602 reflects and refracts the light back to the reflective grating 603. The grating 603 is a flat reflective grating with 45 lines/mm. The rotationally symmetric aspheric lens 602 is zinc selenide allowing for transmission of visible light. The diffracted order then propagates back to the lens 602, which reflects and focuses the light onto the 2D detector array 604.

Figure 7:
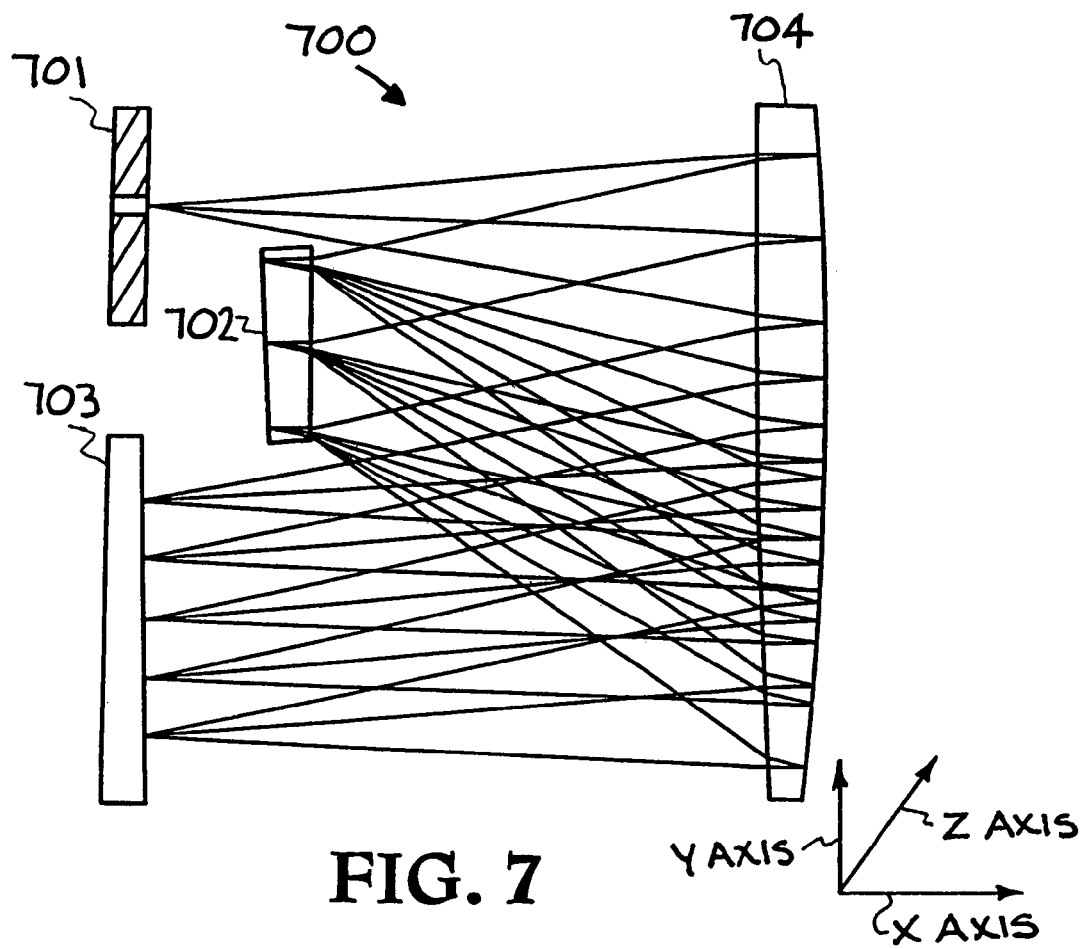
FIG. 7 illustrates an embodiment of a compact imaging spectrometer utilizing a catadioptric lens constructed in accordance with the present invention.

Referring to FIG. 7 of the drawings, an embodiment of a compact imaging spectrometer constructed in accordance with the present invention is illustrated. This embodiment of the present invention is designated generally by the reference numeral 700. FIG. 7 is a raytrace for the imaging spectrometer 700. The structural elements of the compact imaging spectrometer 700 include an entrance slit 701, a germanium grating 702, an array detector 703, and a zinc selenide catadioptric lens 704. The imaging spectrometer 700 has a size envelope that is smaller than spectrometers currently in use. The entrance slit 701, the grating 702, the detector array 703, and the zinc selenide catadioptric lens 704 fit within the envelope. The envelope is 3.0 cm by 2.7 cm by 1.6 cm or smaller. As shown in FIG. 7 the X axis is 3.0 cm, the Y axis is 2.7 cm and the Z axis is 1.6 cm.

The imaging spectrometer 700 provides a compact imaging spectrometer based on catadioptric lenses and an immersive diffraction grating. The zinc selenide catadioptric lens 704 in the compact imaging spectrometer 700 consist of rotationally symmetric surfaces. In another embodiment anamorphic aspheric surfaces are used. The cold stop in the compact imaging spectrometer 700 is at the germanium grating. This ensures that the warm background radiation from outside the spectrometer entrance slit does not reach the detector array. This would cause and unacceptable degradation in the signal to noise ratio. The geometry of the compact imaging spectrometer 700 allows a transmissive cold stop to be used ahead of the grating, for even better thermal background reduction, but this also increases the grating sizes.

Figure 8:
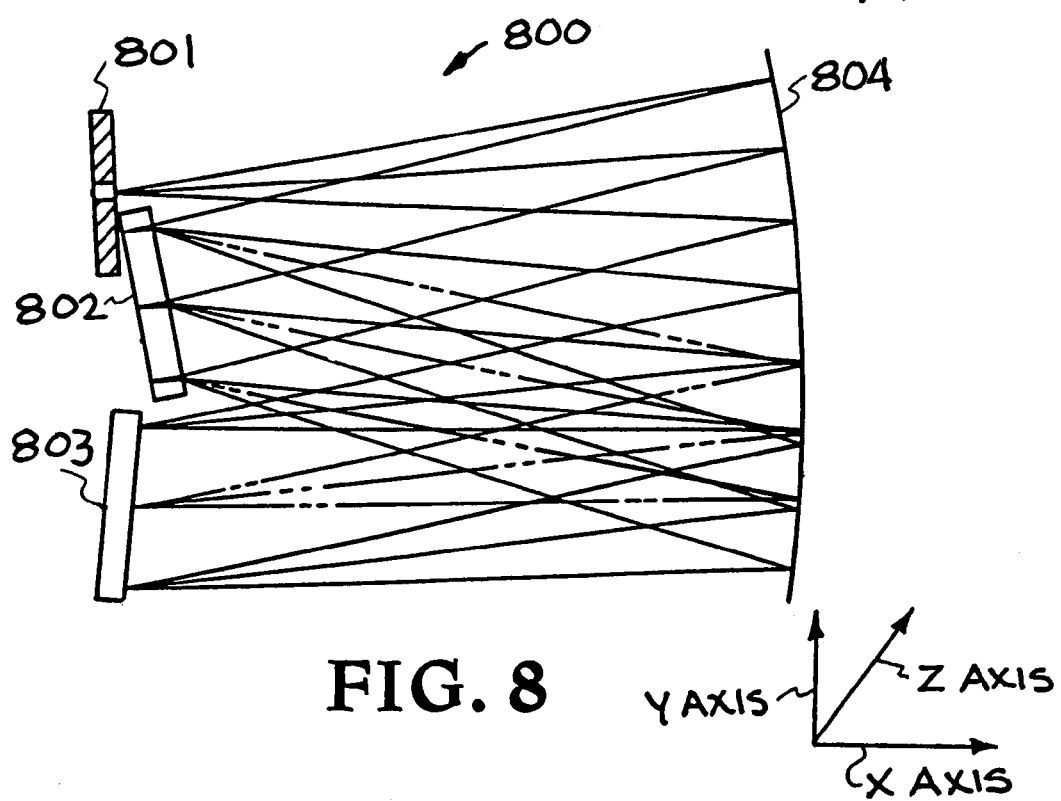
FIG. 8 illustrates an embodiment of a compact imaging spectrometer utilizing an anamorphic mirror constructed in accordance with the present invention.

Referring to FIG. 8 of the drawings, an embodiment of a compact imaging spectrometer constructed in accordance with the present invention is illustrated. This embodiment of the present invention is designated generally by the reference numeral 800. FIG. 8 is a raytrace for the imaging spectrometer 800. The structural elements of the compact imaging spectrometer 800 include an entrance slit 801, a germanium grating 802, an array detector 803, and an anamorphic mirror 804. The imaging spectrometer 800 has a size envelope that is smaller than spectrometers currently in use. The entrance slit 801, the grating 802, the detector array 803, and the anamorphic mirror 804 fit within the envelope. The envelope is 3.5 cm or smaller by 5.0 cm or smaller by 2.0 cm or smaller. As shown in FIG. 8 the X axis is 5.0 cm and the Y axis is 3.5 cm.

The imaging spectrometer 800 provides a compact imaging spectrometer based on an anamorphic mirror and an immersive diffraction grating. The compact imaging spectrometer 800 is smaller than those currently in use and has a reduced cryogenic cooling requirement enabling its use in small unmanned aerial vehicles and for man portable instruments. The compact imaging spectrometer 800 can be utilized for remote sensing imaging spectrometers where size and weight are of primary importance. The compact imaging spectrometer 800 has very good spectral and spatial registration providing accurate spectral data for spectral algorithm retrievals. This avoids having to resample the images to correct for these defects, which has the disadvantage of creating spectral mixing between pixels reducing the sensitivity and accuracy of the retrieval algorithms.

Figure 9:
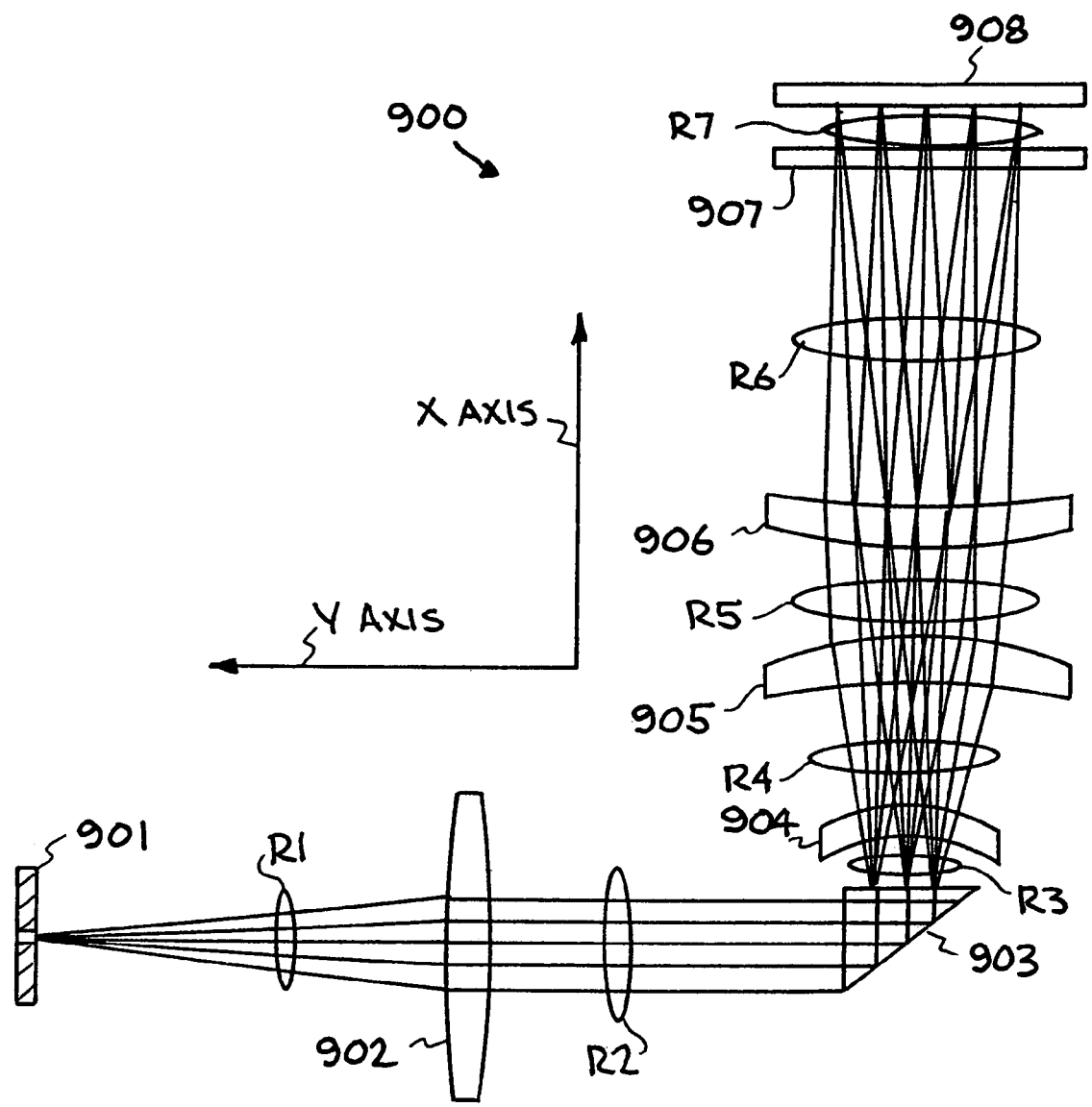
FIG. 9 illustrates an embodiment of a compact refractive imaging spectrometer constructed in accordance with the present invention.

Referring to FIG. 9 of the drawings, an embodiment of a compact imaging spectrometer constructed in accordance with the present invention is illustrated. This embodiment of the present invention is designated generally by the reference numeral 900.

FIG. 9 is a raytrace for the imaging spectrometer 900. The structural elements in the compact imaging spectrometer 900 include slit 901, collimating lens 902, immersed diffractive grating 903, objective triplet lens L1 904, objective triplet lens L2 905, objective triplet lens L3 906, cold filter 907, and image plane 908.

The imaging spectrometer 900 has a size envelope that is smaller than spectrometers currently in use. The slit 901, collimating lens 902, immersed diffractive grating 903, objective triplet lens L1 904, objective triplet lens L2 905, objective triplet lens L3 906, cold filter 907, and image plane 908 fit within the envelope. The envelope is 8.2 cm by 7.9 cm by 1.4 cm or smaller. As shown in FIG. 9 the X axis is 8.2 cm and the Y axis is 7.9 cm.

The immersed diffractive grating 903 material is germanium. The immersed diffractive grating is on side B. The grating consists of equally spaced straight grooves. The grating has 65 grooves per mm. Angle AB is 51.7°, angle BC is 36.2°, and angle CA is 92.1°.

In operation of the compact imaging spectrometer 900, rays R1 diverge from slit 901. Collimating lens 902 collimates rays R1 to the immersed diffractive grating 903. Rays R2 are collimated. The immersed diffractive grating 903 angularly separates rays R2 according to wavelength. Rays R3 are collimated and angularly separated in wavelength. Longer wavelengths are angled to the left and shorter wavelengths to the right. Lenses 904, 905, and 906 in combination focus rays R3 with minimal distortions. Rays R6 converge and pass through cold filter 907. The cold filter 907 serves to filter out background thermal radiation that is not of interest. Ray R7 focuses onto the image plane 908.

All the lenses in the compact imaging spectrometer 900 have spherical surfaces. The diffraction grating has the rulings immersed into a flat germanium surface. The grating can be diamond flycut with a blazed profile that will have maximum diffraction efficiency. In the compact imaging spectrometer 900, conventional gratings are used with equally spaced straight rulings. For the diffraction grating, light enters from the front germanium surface (which may have power) and then passes through the germanium to diffract off the grating rulings at the back surface. The diffracted light then propagates through the germanium and out. The grating is cut on the back of a wedged prism. The refractive faces of the prism may be spherical or plano. In the compact imaging spectrometer 900 the power has been eliminated from the prism resulting in the grating being cut on a side of a wedged germanium prism. Although the grating is cut into germanium in this design, other refractive materials such as zinc selenide are also suitable.

Figure 10:
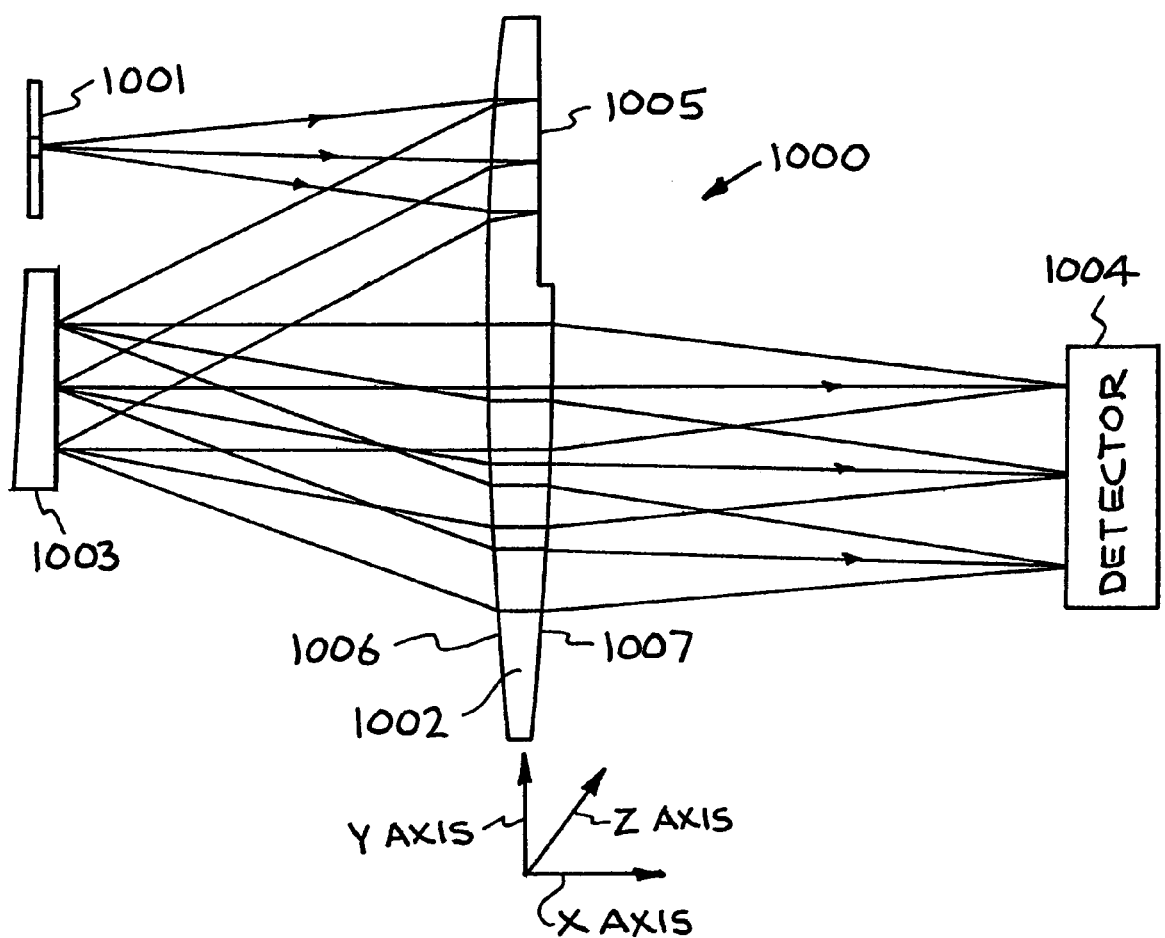
FIG. 10 illustrates an embodiment of an imaging spectrometer utilizing a catadioptric lens constructed in accordance with the present invention.

Referring to FIG. 10 of the drawings, an embodiment of a compact imaging spectrometer constructed in accordance with the present invention is illustrated. This embodiment of the present invention is designated generally by the reference numeral 1000. FIG. 10 is a raytrace for the imaging spectrometer 1000 with a round pupil. The structural elements of the compact imaging spectrometer 1000 include an entrance slit 1001, an aspheric catadioptric lens 1002 with a flat mirror surface 1005, a germanium immersion grating 1003, and detector 1004. The light goes from the entrance slit 1001 to the lens 1002 which transmits it to a mirrored flat surface 1005 on the back of the lens 1002, then back through the lens 1002 that refracts it to the ruled germanium immersion grating 1003. The diffracted order then propagates back to the lens 1002 which focuses the light onto the 2D detector array 1004. On the detector array 1004 the wavelength dispersion is in the Y-axis direction and the spatial direction is along the Z-axis.

The germanium grating 1003 is a wedged prism that is aspheric on the face and with the grating ruled on the flat reflective side. Baffles are inserted at select locations to meet stray light requirements. The zero order from the grating exits the front face is trapped by a v-shaped baffle.

The catadioptric lens 1002 in the spectrometer 1000 consists of a rotationally symmetric front surface 1006 and an asphere 1007 on the back surface. A reflective plano surface is located in a small section of the lens 1002 in order to redirect the light back to the grating 1003, thereby allowing the slit 1001 and focal plane array 1004 to be arranged at opposite ends of the optical system which in turn provides a practical packaging advantage for using standard packaged focal plane arrays. The flat surface can be diamond turned into a segment of the lens surface.

The diffraction grating 1003 has the rulings immersed into a prism. The grating can be diamond flycut with a blazed profile that will have maximum diffraction efficiency at a desired wavelength. In the spectrometer 1000 conventional gratings are used with equally spaced straight rulings on a flat surface. Additional aberration correction can be obtained with curved grooves with a varied groove spacing or with a holographically formed grating. For the diffraction grating 1003, light enters from the front germanium surface, which has power, and then passes through the germanium to diffract off the grating rulings at the back surface. The diffracted light then propagates through the prism and out. The grating is cut on the back of a wedged prism. The refractive face of the prism may be spherical or aspherical.

For the spectrometer 1000 shown the diffraction grating is on a flat surface. For stray light control the angular orientation of the front face is arranged so that its Fresnel reflection misses the detector surface.

The spectrometer 1000 meets the requirements is Table 1 is diffraction limited over the infrared wavelength range with excellent spatial and spectral resolutions. The spectral slit curvature has been corrected to less than one tenth of a pixel over the detector arrays. This is the curvature of slit image on the detector at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row pixels by less than ±2 microns. Correcting the spectral slit curvature and the spatial mapping distortion with wavelength to less than one tenth of a pixel ensures that the images do not have to be resampled to correct for these effects.

The imaging spectrometer 1000 has a size envelope that is smaller than spectrometers currently in use. The entrance slit 1001, flat mirror 1005, aspheric lens 1002, germanium grating 1003, and detector 1004 fit within the envelope. The X axis and the Y axis are shown in the plane of the paper. The Z axis extends perpendicular to both the X axis and the Y axis. The envelope is 60 mm by 40 mm by 40 mm or smaller. As shown in FIG. 10, the X axis is 60 mm, the Y axis is 40 mm, and the Z axis is 40 mm. The compact imaging spectrometer 1000 has a front and a back. The entrance slit 1001 is located at or near the front and the detector 1004 is located at or near the back.

Figure 11:
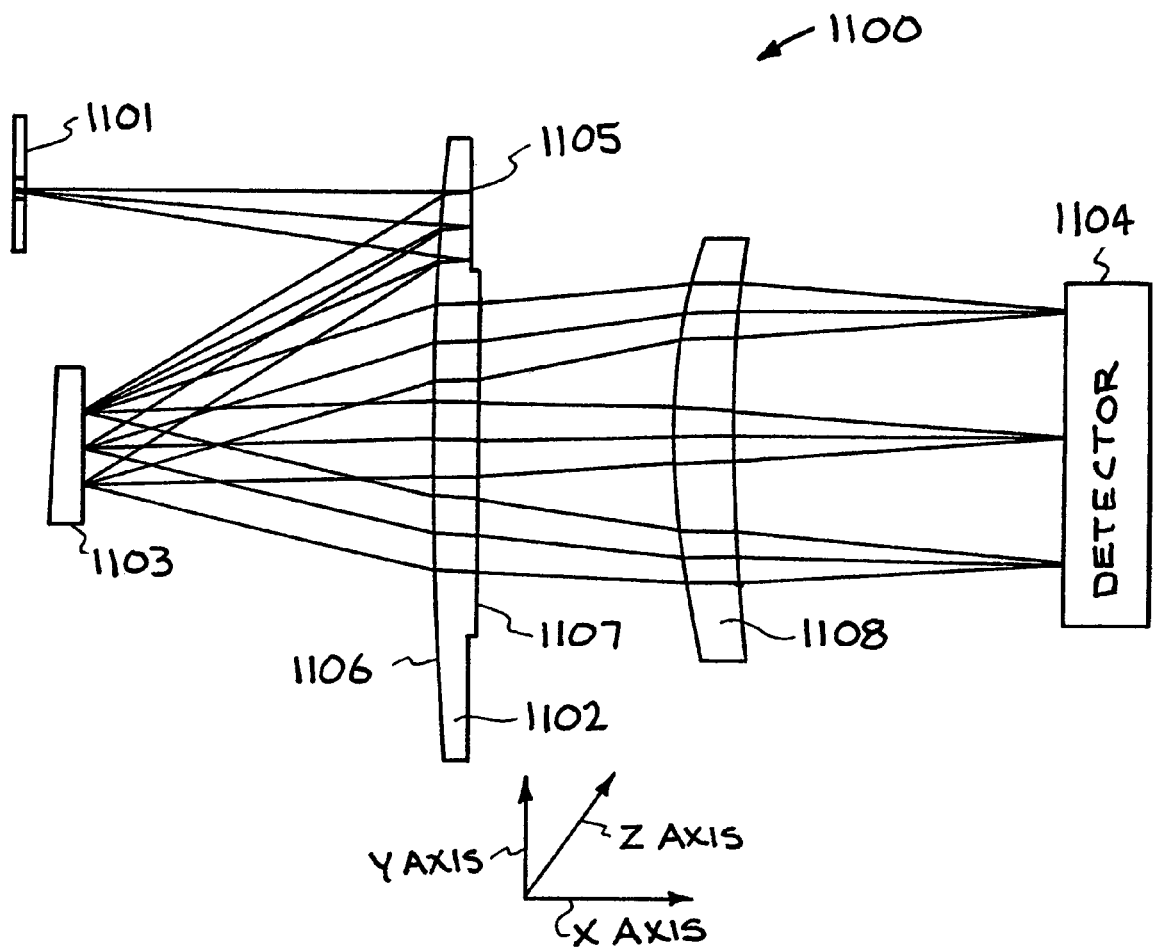
FIG. 11 illustrates another embodiment of a compact imaging spectrometer constructed in accordance with the present invention.

Referring to FIG. 11, another embodiment of a compact imaging spectrometer constructed in accordance with the present invention is illustrated. This embodiment of the present invention is designated generally by the reference numeral 1100. FIG. 11 is a raytrace of the imaging spectrometer 1100 for midwave infrared covering approximately the 3 to 5 micron band. The imaging spectrometer 1100 performance meets all the requirements in Table 2.

TABLE 2

| | |
|---|---|
| Spectral Range | 3.2–5.3 microns |
| F-number (round or square) | 6.5 |
| Detector array | 480 spatial × 640 spectral |
| Pixel Size | 27 microns |
| Entrance Slit Length | 12.96 mm |
| Spatial Distortion: Change in Spatial Mapping with Wavelength | <0.1 pixel (<±1.3 microns) |
| Spectral Distortion: Spectral Smile | <0.1 pixel (<±1.3 microns) |
| Optical Performance | Diffraction Limited |
| Ghosting | <0.1% of the primary image |

The imaging spectrometer 1100 has use for Homeland Defense to check for the presence of biological or chemical weapons without entering the contaminated areas. The imaging spectrometer 1100 also has use for commercial remote sensing where portability is important. The imaging spectrometer 1100 can be used for pollution detection, and remote sensing of agricultural crops, and geological identification among the various potential applications. The imaging spectrometer 1100 can be used for the remote monitoring of industrial processes.

The structural elements of the compact imaging spectrometer 1100 include an entrance slit 1101, an aspheric catadioptric lens 1102 with a flat mirror surface 1105, a germanium grating 1103, and additional lens 1108 and detector 1104. The light goes from the entrance slit 1101 to the lens front surface 1106 which transmits it to a mirrored flat surface 1105 on the back of the lens 1102, then back through the lens surface 1106 that refracts it to the ruled germanium immersion grating 1103. The diffracted order then propagates back to the lens 1102 which focuses the light onto the 2D detector array 1104. The light is dispersed spectrally on the detector array in the Y axis direction and the spatially resolved direction is in the Z axis direction.

The germanium grating 1103 is a wedged prism that is spherical on the input face and with the grating ruled on the flat reflective side. The cold stop is at the grating, which provide the advantage of a telecentric input beam at the exit slit and a telecentric exit beam at the detector. The angular position of the front face of the grating is set so that the Fresnel reflection falls outside the detector area. Baffles are inserted at select locations to meet stray light requirements. The zero order from the grating exits from the front face of the prism and is trapped by a baffle.

In the imaging spectrometer 1100, the grating 1103 and the catadioptric lens 1102 are germanium, and the final lens 1108 is zinc selenide. The mirror annulus 1105 can be diamond turned at the same time as the powered back lens surface is turned. For greater compactness a flat segment on the lens can be flycut instead of the annulus going completely around the lens. The additional zinc selenide lens 1108 provided additional performance to meet the tighter requirements of the large format array with the smaller pixel sizes. The imaging spectrometer 1100 is diffraction limited at all wavelengths and meets the spatial and spectral distortion requirements over the full detector area.

The imaging spectrometer 1100 has a size envelope that is smaller than spectrometers currently in use. The entrance slit 1101, flat mirror 1105, aspheric lens 1102, germanium grating 1103, the lens 60-8, and detector 1104 fit within the envelope. The X axis and the Y axis are shown in the plane of the paper. The Z axis extends perpendicular to both the X axis and the Y axis. The envelope is 71 mm by 43 mm by 43 mm or smaller. As shown in FIG. 5, the X axis is 71 mm, the Y axis is 43 mm, and the Z axis is 43 mm.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A compact imaging spectrometer apparatus, comprising:
   an entrance slit for transmitting light,
   lens means for receiving said light and directing said light,
   an immersion grating, and
   a detector array,
   said entrance slit, said lens means for receiving said light, said immersion grating, and said a detector array positioned wherein
   said entrance slit transmits light to said lens means for receiving said light and
   said lens means for receiving said light directs said light to said immersion grating and
   said immersion grating receives the light and directs to said lens means for receiving said light,
   said lens means for receiving said light directs said light to said detector array.

2. The compact imaging spectrometer apparatus of claim 1 wherein said immersion grating has a surface that is plano, spherical or aspherical.

3. The compact imaging spectrometer apparatus of claim 1 wherein said immersion grating has three degrees of freedom wedge, tilt, and grating spacing, and has groove curvature, curved grooves with a varied groove spacing or with a holographic formed grating.

4. An imaging spectrometer apparatus, comprising:
an entrance slit for directing light,
a catadioptric lens means for receiving said light and directing said light,
a reflective grating that receives said light from said catadioptric lens means and diffracts said light back onto said catadioptric lens means which focuses said light, and
a detector that receives said focused light.

5. An imaging spectrometer apparatus, comprising:
an entrance slit for directing light,
a catadioptric lens that receives said light and directs said light,
an immersed grating, and
a detector array, wherein said entrance slit directs light to said catadioptric lens, said catadioptric lens receives said light and reflects said light to said immersed grating, said immersed grating receives said light from said catadioptric lens and diffracts said light back onto said catadioptric lens, and said catadioptric lens refracts and reflects said light back to the detector array.

6. A compact imaging spectrometer apparatus, comprising:
an entrance slit,
a catadioptric lens with a mirrored surface,
a refractive lens,
an immersed diffraction grating, and
a detector array,
said entrance slit, said catadioptric lens with said mirrored surface, said refractive lens, said immersed diffraction grating, and said a detector array positioned wherein said entrance slit directs light to said catadioptric lens, to said mirrored surface, said mirrored surface receives the light and reflects the light back through said lens to said diffraction grating, said grating receives the light from said catadioptric lens and diffracts the light back to said catadioptric lens, and said catadioptric lens transmits and focuses the light to the said refractive lens, said refractive lens receives said light from said catadioptric lens and focuses said light onto said detector array.

* * * * *